United States Patent
Yamashita et al.

(10) Patent No.: US 9,405,470 B2
(45) Date of Patent: Aug. 2, 2016

(54) DATA PROCESSING SYSTEM AND DATA PROCESSING METHOD

(71) Applicant: FUJITSU LIMITED, Kawasaki-shi, Kanagawa (JP)

(72) Inventors: Koichiro Yamashita, Hachioji (JP); Hiromasa Yamauchi, Usakos (NA); Takahisa Suzuki, Yokohama (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 47 days.

(21) Appl. No.: 14/172,005

(22) Filed: Feb. 4, 2014

(65) Prior Publication Data
US 2014/0149691 A1    May 29, 2014

Related U.S. Application Data

(63) Continuation of application No. PCT/JP2011/067990, filed on Aug. 5, 2011.

(51) Int. Cl.
*G06F 3/00* (2006.01)
*G06F 3/06* (2006.01)
*G06F 9/50* (2006.01)

(52) U.S. Cl.
CPC ............ *G06F 3/0604* (2013.01); *G06F 3/0655* (2013.01); *G06F 3/0673* (2013.01); *G06F 9/50* (2013.01); *G06F 9/5016* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 6,289,369 B1 * | 9/2001 | Sundaresan | 718/103 |
| 6,360,303 B1 * | 3/2002 | Wisler et al. | 711/152 |
| 7,802,057 B2 * | 9/2010 | Iyer | G06F 9/5016 711/133 |
| 8,886,918 B2 * | 11/2014 | Capps, Jr. | G06F 9/30101 712/220 |
| 2004/0003188 A1 * | 1/2004 | Rao | G06F 9/5016 711/154 |
| 2008/0003188 A1 * | 1/2008 | Kunin | 424/62 |
| 2008/0109817 A1 * | 5/2008 | Nakamura | G06F 9/5033 718/105 |
| 2010/0211756 A1 * | 8/2010 | Kaminski | G06F 12/023 711/172 |
| 2015/0007187 A1 * | 1/2015 | Shows | 718/104 |

FOREIGN PATENT DOCUMENTS

| | | |
|---|---|---|
| JP | 63-184601 | 7/1988 |
| JP | 2004-54933 | 2/2004 |
| JP | 2007-323393 | 12/2007 |
| JP | 2008-108089 | 5/2008 |
| WO | WO 2007/017932 | 2/2007 |

OTHER PUBLICATIONS

Japanese Office Action dated Nov. 11, 2014 in corresponding Japanese Patent Application No. 2013-527764.
International Search Report issued on Oct. 25, 2011 in corresponding International Application No. PCT/JP2011/067555.
PCT International Preliminary Report on Patentability mailed Feb. 20, 2014 in corresponding International Application No. PCT/JP2011/067990.

* cited by examiner

*Primary Examiner* — Elias Mamo
(74) *Attorney, Agent, or Firm* — Staas & Halsey LLP

(57) ABSTRACT

A data processing system includes multiple data processing apparatuses; a peripheral apparatus; memory that is shared by the data processing apparatuses and the peripheral apparatus; peripheral memory provided corresponding to the peripheral apparatus; and a memory managing unit that secures in any one among the memory and the peripheral memory, an area for a thread that is based on thread information, the area being secured based on the thread information that is read out from a heap area that sequentially stores the thread information that is executed at any one among the data processing apparatuses and the peripheral apparatus.

8 Claims, 15 Drawing Sheets

FIG.6

MEMORY UTILIZATION TABLE ~421

| | MEMORY TYPE | AVAILABLE CAPACITY | |
|---|---|---|---|
| 421-1 | MAIN MEMORY 103 | 50 [MBYTES] | ACCESS SPEED ↓ |
| 421-2 | GPU MEMORY 102 | 10 [MBYTES] | |
| 421-3 | DSP MEMORY 202 | 20 [MBYTES] | |
| | ... | ... | |

FIG.7

THREAD OPERATION HISTORY TABLE ~422

| | THREAD ID | CPU ID |
|---|---|---|
| 422-1 | THREAD 1 | #1 |
| 422-2 | THREAD 0 | #0 |
| 422-3 | MEMORY MANAGEMENT THREAD 122 | #1 |
| 422-4 | THREAD 1 | #1 |
| 422-5 | MEMORY MANAGEMENT THREAD 122 | #1 |
| | ... | ... |

DATA PROCESSING SYSTEM AND DATA PROCESSING METHOD

CROSS REFERENCE TO RELATED APPLICATIONS

This application is a continuation application of International Application PCT/JP2011/067990, filed on Aug. 5, 2011 and designating the U.S., the entire contents of which are incorporated herein by reference.

FIELD

The embodiment discussed herein is related to a data processing system that manages memory, and a data processing method.

BACKGROUND

Conventionally, the memory architecture of mobile terminals such as mobile telephones includes various types of memory such as graphics RAM used by a graphics processing unit (GPU), buffer memory used by a digital signal processor (DSP), and video RAM of a liquid crystal display (LCD) controller, in addition to random access memory (RAM), which is primarily accessed by a central processing unit (CPU).

As a method of accessing such types of memory, for example, a technique has been disclosed that performs management related to accessing memory by a thread that is run to access memory by application software (hereinafter, "app") (for example, refer to Japanese Laid-Open Patent Publication No. 2008-108089). A process that is executed by a CPU is managed in units of threads.

Nonetheless, with the technique above, when configuration is such that a thread that manages memory access can be executed by an arbitrary CPU, an exclusive control process has to be added to prevent contention that occurs consequent to concurrent access. Consequently, a problem of increased overhead arises.

SUMMARY

According to an aspect of an embodiment, a data processing system includes multiple data processing apparatuses; a peripheral apparatus; memory that is shared by the data processing apparatuses and the peripheral apparatus; peripheral memory provided corresponding to the peripheral apparatus; and a memory managing unit that secures in any one among the memory and the peripheral memory, an area for a thread that is based on thread information, the area being secured based on the thread information that is read out from a heap area that sequentially stores the thread information that is executed at any one among the data processing apparatuses and the peripheral apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram of an example of the contents of a memory utilization table;

FIG. 7 is a diagram of an example of a thread operation history table;

DESCRIPTION OF EMBODIMENTS

An embodiment of a data processing system and a data processing method will be described in detail with reference to the accompanying drawings. A multi-core processor system having multiple CPUs will be taken as an example of the data processing system of the embodiment. A multi-core processor is a processor that is equipped with multiple cores. As long as multiple cores are provided, the cores may be provided as a single processor equipped with multiple cores or as a group of single-core processors in parallel. For the sake of simplicity, in the present embodiment, description will be given taking a group of single-core processors in parallel as an example.

Figure 1:
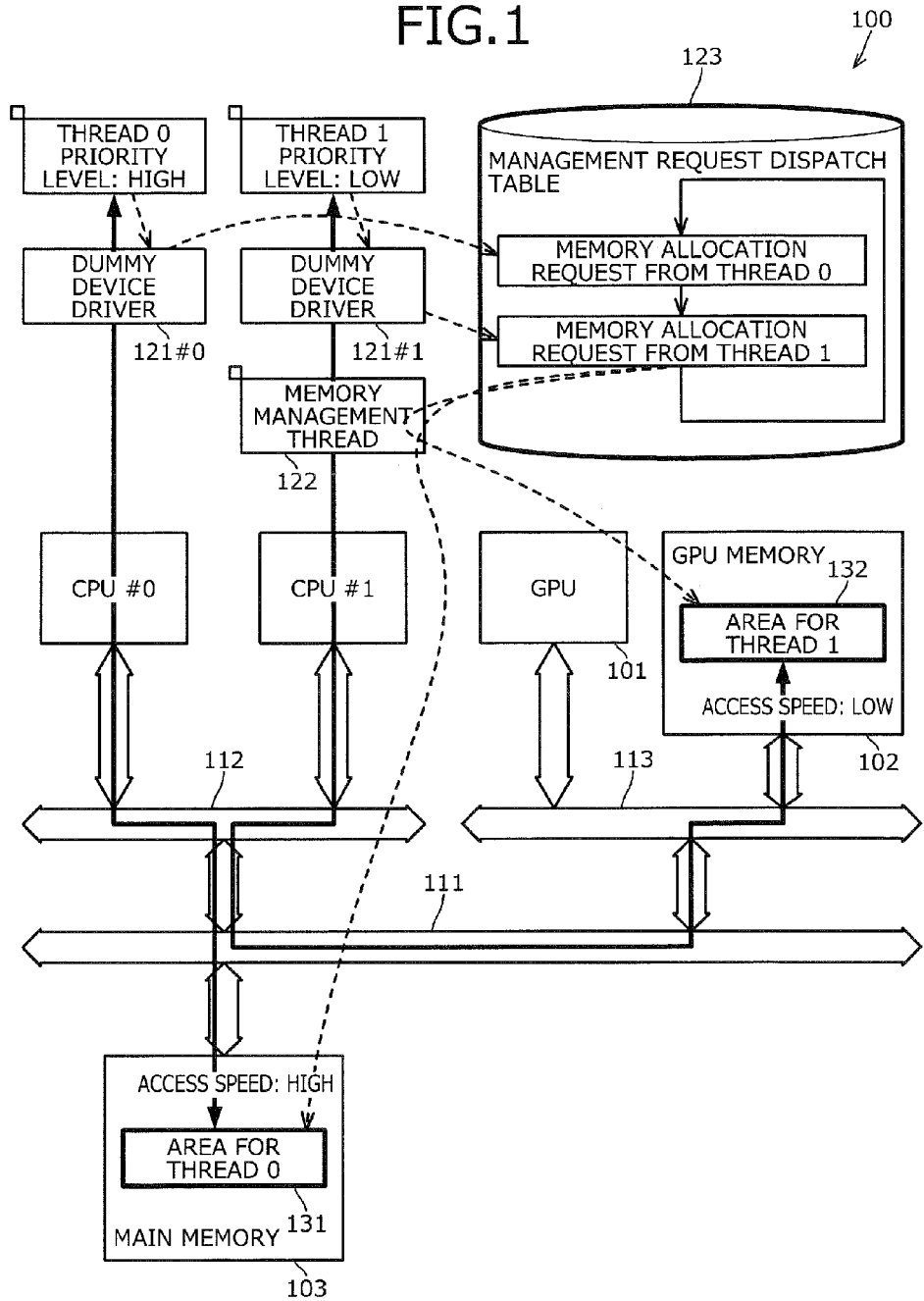
FIG. 1 is a diagram of an operation example of a multi-core processor system.

FIG. 1 is a diagram of an operation example of the multi-core processor system. A multi-core processor system 100 includes a CPU #0, a CPU #1, a GPU 101, GPU memory 102, and main memory 103. Hereinafter, a suffix "#n" appended to a reference numeral is a symbol corresponding to an n-th CPU. The CPUs #0 and #1 are connected by a local bus 112; and the GPU 101 and the GPU memory 102 are connected by a local bus 113. The local buses 112 and 113 and the main memory 103 are connected by a bus 111. The main memory 103 is memory for which the access speed is high and the GPU memory 102 is memory for which the access speed is low. Apparatuses excluding the CPUs are referred to as peripheral apparatuses. Memory provided and corresponding to the peripheral apparatuses is referred to as peripheral memory. In the example depicted in FIG. 1, the GPU memory 102 is peripheral memory.

The CPU #0 executes a high priority thread 0; and the CPU #1 executes a low priority thread 1 and a memory management thread 122. The CPUs #0 and #1 execute dummy device drivers 121#0 and 121#1, upon executing a memory allocation request such as a malloc( ) function, by the threads 0 and 1.

The dummy device drivers 121 have an application programming interface (API), which is identical to that of general device drivers for peripheral devices. With respect to the dummy device drivers 121, a thread can perform the same operations as with a general device driver. The dummy device drivers 121, upon receiving a memory allocation request, store the memory allocation request to which thread information is appended, to a management request dispatch table 123 that is stored in the main memory 103. The thread information is information that includes the thread name and the priority level of the thread.

The memory management thread 122 sequentially reads from the management request dispatch table 123, the memory allocation requests and according to the thread information of the memory allocation requests, allocates an area of the main memory 103 or of the GPU memory 102.

In the example depicted in FIG. 1, the memory management thread 122 first secures in the main memory 103, an area 131 for the thread 0 and subsequently, secures in the GPU memory 102 an area 132 for the thread 1. In this manner, the multi-core processor system 100 stores to the management request dispatch table 123, the memory allocation requests from threads under execution at multiple CPUs, sequentially reads out the memory allocation requests, and allocates memory of the main memory 103 and peripheral apparatus memory for the memory allocation requests. Thus, the multi-core processor system 100 can secure memory without the occurrence of contention resulting from concurrent access. With reference to FIGS. 2 to 15, the operation depicted in FIG. 1 and performed by the multi-core processor system 100 will be described.

Figure 2:
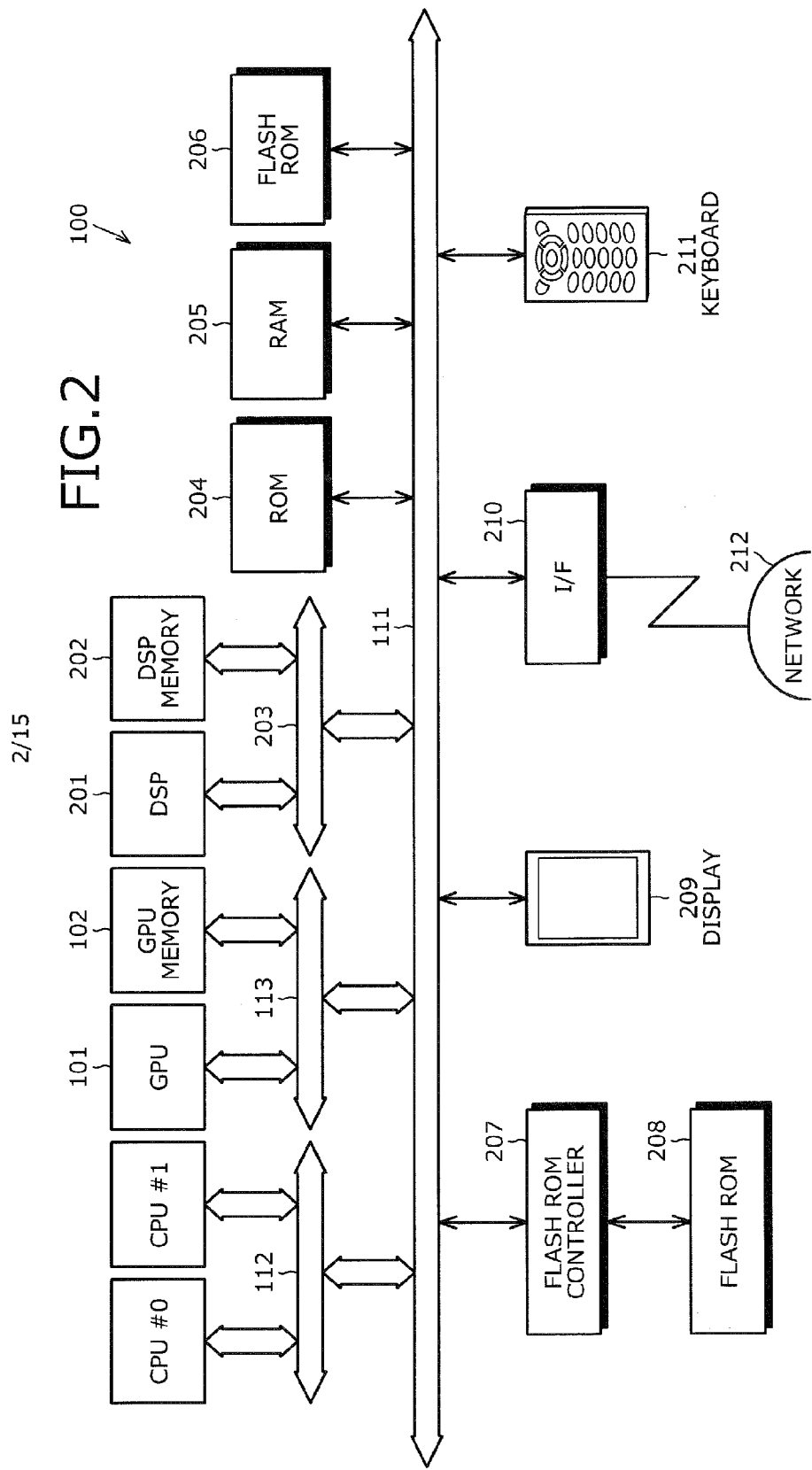
FIG. 2 is a block diagram of a hardware example of the multi-core processor system.

FIG. 2 is a block diagram of a hardware example of the multi-core processor system. As depicted in FIG. 2, a mobile terminal such as a mobile telephone is assumed as the multi-core processor system 100, which includes the CPU #0, the CPU #1, the GPU 101, the GPU memory 102, the main memory 103, a DSP 201, and DSP memory 202. The DSP 201 and the DSP memory 202 are connected by a local bus 203. The multi-core processor system 100 further includes read-only memory (ROM) 204, RAM 205, flash ROM 206, a flash ROM controller 207, and flash ROM 208.

The multi-core processor system 100 includes a display 209, an interface (I/F) 210, and a keyboard 211 as input/output apparatuses for the user and other devices. The components are respectively connected by the bus 111. The main memory 103 depicted in FIG. 1 may be the RAM 205 or a portion of the RAM 205. Further, the main memory 103 is memory shared and accessed by the CPU #0, the CPU #1, the GPU 101, the DSP 201, etc.

In this example, the CPUs #0 and #1 govern overall control of the multi-core processor system 100. The CPUs #0 and #1 represent all of the single-core processors connected in parallel. The multi-core processor system 100 may include 3 or more CPUs. The CPUs #0 to #n respectively have dedicated cache memory.

The ROM 204 stores programs such as a boot program. The RAM 205 is used as a work area of the CPUs #0 and #1. The flash ROM 206 is flash ROM for which the read out speed is high and is, for example, NOR flash memory. The flash ROM 206 stores system software such an operating system (OS) and apps. For example, when an OS is updated, the multi-core processor system 100 receives the new OS via the I/F 210, and updates the old OS stored in the flash ROM 206 with the new OS.

The flash ROM controller 207, under the control of the CPUs #0 and #1, controls the reading and writing of data with respect to the flash ROM 208. The flash ROM 208 is flash ROM intended for storage and portability, and is, for example, NAND flash memory. The flash ROM 208 stores data written thereto under the control of the flash ROM controller 207. Examples of the data include image data and video data obtained via the I/F 210 by the user of the multi-core processor system 100, as well as a program that executes the data processing method of the present embodiment. A memory card, an SD card, and the like may be employed as the flash ROM 208, for example.

The display 209 displays, for example, data such as text, images, functional information, etc., in addition to a cursor, icons, and/or tool boxes. A thin-film-transistor (TFT) liquid crystal display, a plasma display, etc., may be employed as the display 209.

The I/F 210 is connected to a network 212 such as a local area network (LAN), a wide area network (WAN), and the Internet, via a communication line. The I/F 210 administers an internal interface with the network 212 and controls the input and output of data with respect to external apparatuses. A modem, a LAN adapter, and the like may be employed as the I/F 210.

The keyboard 211 includes, for example, keys for inputting letters, numerals and various instructions, and performs the input of data. Alternatively, a touch-panel-type input pad or numeric keypad, etc. may be adopted.

Thus, although the multi-core processor system 100 has shared memory architecture from the perspective of the CPUs, the multi-core processor system 100 has distributed memory architecture that has multiple memory masters such as the GPU 101 and the DSP 201. Furthermore, the main memory 103, the GPU memory 102, and the DSP memory 202 are handled as shared space that can be accessed by the masters respectively, forming a complicated nested structure.

Figure 3:
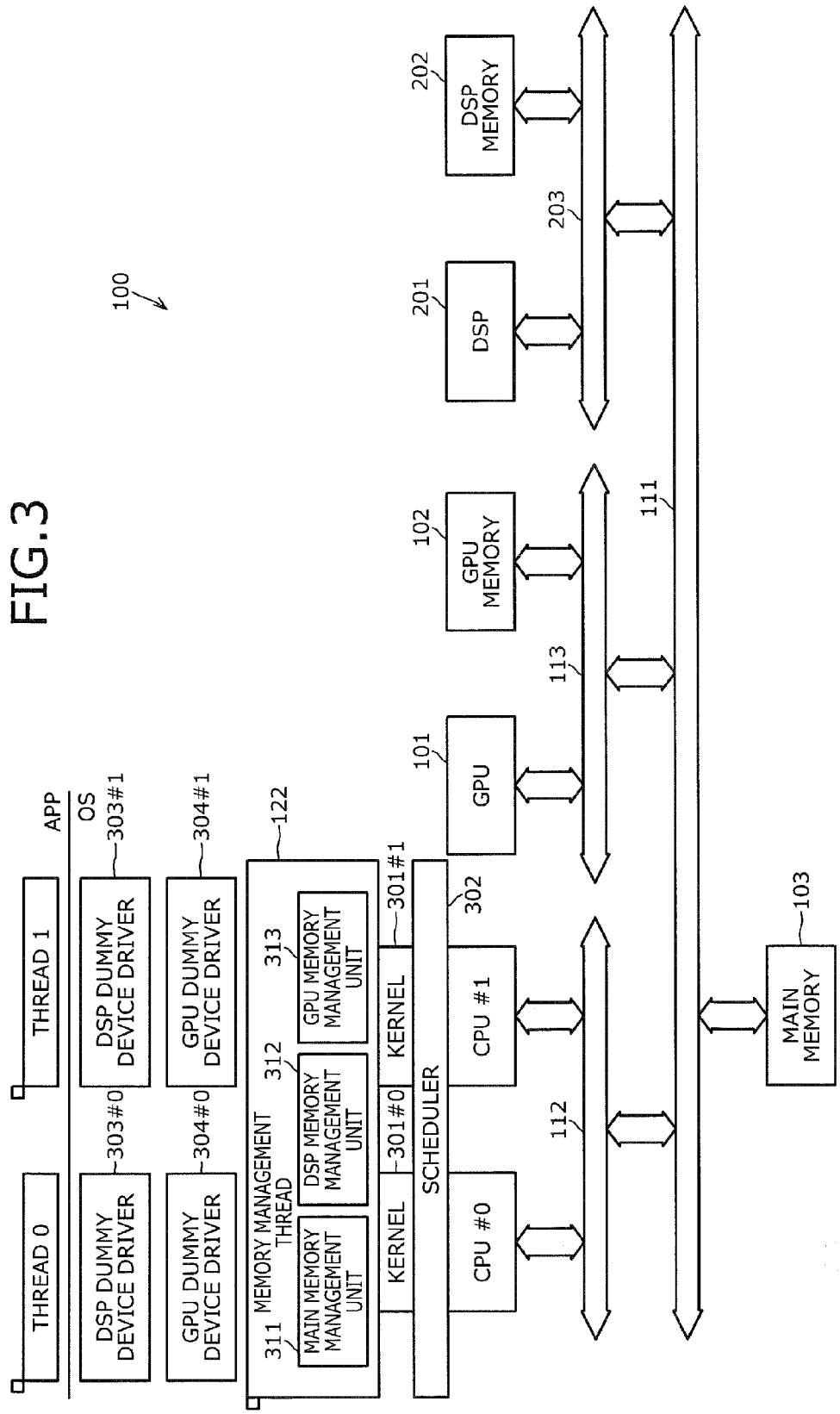
FIG. 3 is a block diagram of a software example of the multi-core processor system.

FIG. 3 is a block diagram of a software example of the multi-core processor system. The multi-core processor system 100, executes as OS-provided software, a kernel 301, a scheduler 302, the memory management thread 122, the DSP dummy device driver 303, and a GPU dummy device driver 304. Further, the memory management thread 122 includes a main memory managing unit 311, a DSP memory managing unit 312, and a GPU memory managing unit 313.

The kernel 301, the DSP dummy device driver 303, and the GPU dummy device driver 304 are respectively executed by the CPUs #0 and #1. For example, the CPU #0 executes a kernel 301#0, a DSP dummy device driver 303#0, and a GPU dummy device driver 304#0. The CPU #1 executes a kernel 301#1, a DSP dummy device driver 303#1, and a GPU dummy device driver 304#1. Although the scheduler 302 may be run by any one among the CPU #0 and the CPU #1, in the present embodiment, the CPU #0, which is the master CPU in the multi-core processor system 100, is assumed to execute the scheduler 302. The memory management thread 122 is executed by any one among the CPU #0 and the CPU #1.

The kernel 301 has a function of serving as a core of the OS. For example, when an app is invoked, the kernel 301 expands program code in the main memory 103. The scheduler 302 has a function of assigning to CPUs, threads that are to be executed in the multi-core processor system 100 and a function of selecting threads that are to be executed next. For example, the scheduler 302 assigns the thread 0 to the CPU #0, and assigns the thread 1 to the CPU #1.

The DSP dummy device driver 303 and the GPU dummy device driver 304 are the dummy device drivers 121 for the device drivers of the GPU 101 and the DSP 201, respectively.

The main memory managing unit 311, the DSP memory managing unit 312, and the GPU memory managing unit 313 have a function of managing the main memory 103, the DSP memory 202, and the GPU memory 102, respectively. For example, the main memory managing unit 311, the DSP memory managing unit 312, and the GPU memory managing unit 313 store physical memory addresses and physical address ranges that can be allocated. For instance, the main memory managing unit 311 updates the utilization state, according to allocation requests and release requests for the main memory 103. The DSP memory managing unit 312 and the GPU memory managing unit 313 update the utilization states of the DSP memory 202 and the GPU memory 102, respectively.

Figure 4:
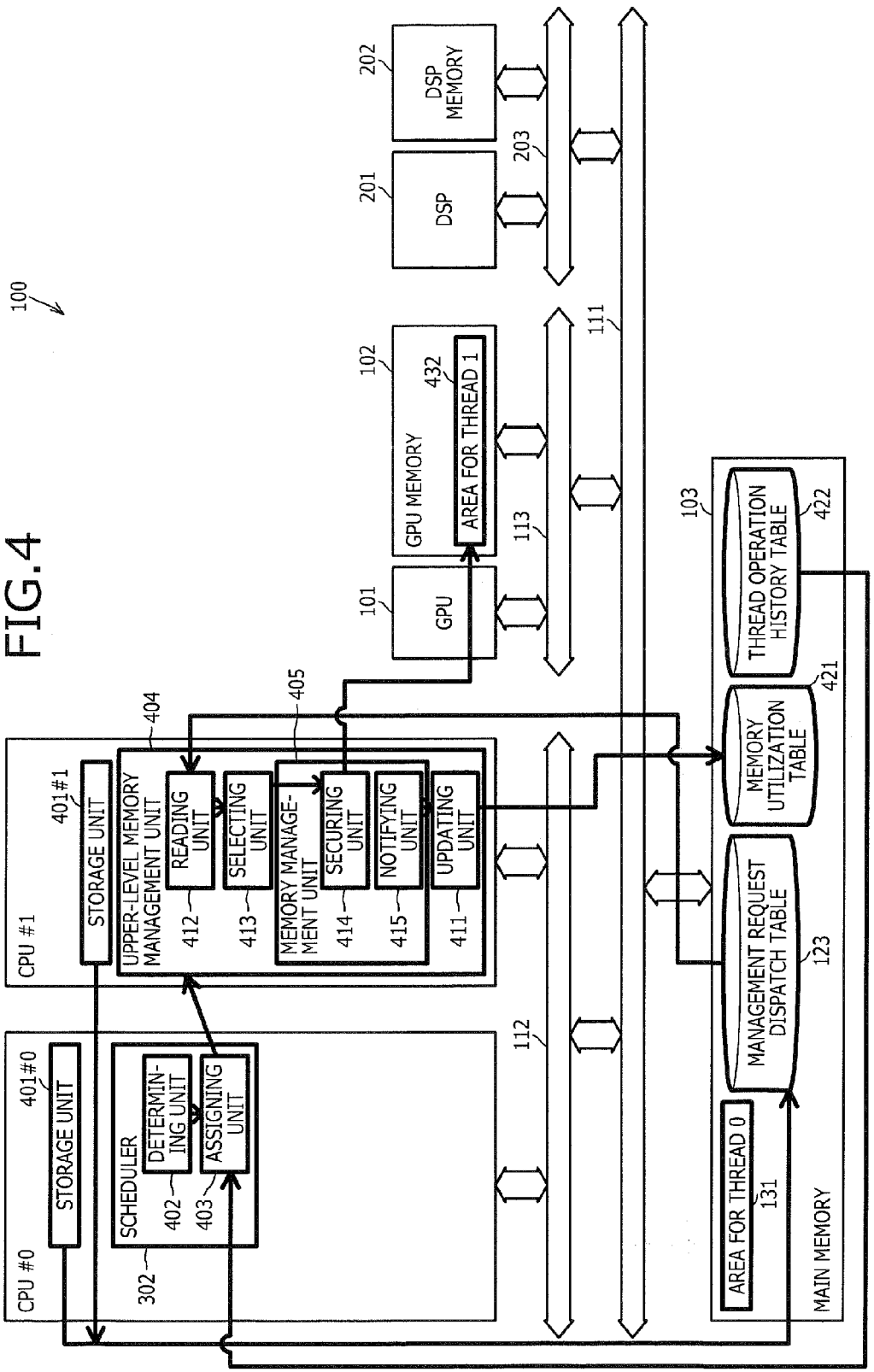
FIG. 4 is a block diagram of an example of functions of the multi-core processor system.

Functions of the multi-core processor system 100 will be described. FIG. 4 is a block diagram of an example of functions of the multi-core processor system. The multi-core processor system 100 includes a storage unit 401, a determining unit 402, an assigning unit 403, an upper-level memory managing unit 404, a memory managing unit 405, an updating unit 411, a reading unit 412, a selecting unit 413, a securing unit 414, and a notifying unit 415. These functions (the storage unit 401 to the notifying unit 415) forming a control unit are implemented by executing on the CPUs #0 and #1, programs stored in a storage apparatus. The storage apparatus is, for example, the ROM 204, the RAM 205, the flash ROM 206, the flash ROM 208 depicted in FIG. 2, and the like.

The storage unit 401 is a function of the dummy device driver 121. The determining unit 402 and the assigning unit 403 are functions of the scheduler 302; and the upper-level memory managing unit 404 is a function of the memory management thread 122. The memory managing unit 405 is a function of the main memory managing unit 311 to the GPU memory managing unit 313. The updating unit 411, the reading unit 412, and the selecting unit 413 are included in the upper-level memory managing unit 404; and the securing unit 414 and the notifying unit 415 are included in the memory managing unit 405. In FIG. 4, although the determining unit 402 and the assigning unit 403 are depicted as functions of the CPU #0, and the upper-level memory managing unit 404 is depicted as a function of the CPU #1, the determining unit 402 and the assigning unit 403 may be functions of the CPU #1, and the upper-level memory managing unit 404 may be a function of the CPU #0.

The multi-core processor system 100 has access to the management request dispatch table 123, a memory utilization table 421, and a thread operation history table 422.

The management request dispatch table 123 resides in a heap area, which is dynamically securable memory, and stores thread information and memory management requests executed by the CPU #0, the CPU #1, the GPU 101, and the DSP 201. The management request dispatch table 123 will be described in detail with reference to FIG. 5. The memory utilization table 421 stores the availability state of the main memory 103 and peripheral memory. The memory utilization table 421 will be described in detail with reference to FIG. 6. The thread operation history table 422 stores information indicating the CPU at which a thread has been run. The thread operation history table 422 will be described in detail with reference to FIG. 7.

The storage unit 401 has a function of storing in sequence and to a heap area, thread information executed by multiple data processing apparatuses or peripheral apparatuses. For example, the storage unit 401 stores thread information executed by the CPU #0, the CPU #1, the GPU 101, and the DSP 201 to the management request dispatch table 123. Storage of the thread information in sequence is sequential storage of the thread information.

The determining unit 402 has a function of determining whether the loads of multiple data processing apparatuses are in a balanced state. For example, the determining unit 402 determines whether the loads of the CPU #0 and the CPU #1 are in a balanced state. As a method of making such determination, for example, the determining unit 402 uses a load determining function of the OS; calculates for each CPU, the amount of time that a thread occupies the CPU; and based on the loads of the CPUs, determines whether the loads are in a balanced state. If the loads of the CPUs are equal or can be approximated to be equal based on a threshold, the determining unit 402 determines the loads to be in a balanced state; and if the loads of the CPUs are greater than or equal to the threshold, the determining unit 402 determines that the loads are not in a balanced state. The result of the determination is stored to a memory area such as in the RAM 205 and the flash ROM 206.

The assigning unit 403 has a function of assigning execution of the upper-level memory managing unit 404 and the memory managing unit 405 to the data apparatus having the smallest load among the data processing apparatuses, when the CPU loads have been determined by the determining unit 402 to not be in a balanced state. For example, when the loads of the CPU #0 and the CPU #1 are not in a balanced state, the assigning unit 403 assigns the memory management thread 122 to the CPU #0, #1 having the smaller load.

If the determining unit 402 determines that the loads area in a balanced state, the assigning unit 403 may assign the execution of the upper-level memory managing unit 404 and the memory managing unit 405 to a data processing apparatus to which the execution has been assigned in the past or to a peripheral apparatus. For example, if the loads of the CPU #0 and the CPU #1 are in a balanced state, the assigning unit 403 refers to the thread operation history table 422 and assigns the execution to the CPU #0, #1 to which the execution has been assigned in the past.

The upper-level memory managing unit 404 has a function of managing the utilization state of the main memory 103 and peripheral memory. For example, the upper-level memory managing unit 404 sends an inquiry for the utilization state of memory to the memory managing unit 405 and receives notification of the utilization state from the memory managing unit 405.

The memory managing unit 405 has a function of managing memory. The memory managing unit 405 resides respectively in the main memory 103, the GPU memory 102, and the DSP memory 202. With respect to the memory, the memory managing unit 405 performs logical-physical conversions; secures, releases, and re-secures areas; and performs reading and writing.

The updating unit 411 has a function of updating the memory utilization table 421, based on the received utilization state. For example, the updating unit 411 stores to the memory utilization table 421, the utilization state notified by the memory managing unit 405.

The reading unit 412 has a function of reading thread information from the heap area. For example, the reading unit 412 reads the thread information from the management request dispatch table 123. The results of the reading are stored to a memory area such as in the RAM 205 and the flash ROM 206.

The selecting unit 413 has a function of selecting based on the thread information read from the heap area, the memory or peripheral memory to secure an area thereon for a memory allocation request from a thread based on the thread information. The selecting unit 413 may make the selection for the memory allocation request, based on priority level information that is based on the thread information. For example, if the priority level is high, the selecting unit 413 selects the high-speed main memory 103. If the priority level is low, the selecting unit 413 selects the DSP memory 202, which has a slower speed than the main memory 103.

The selecting unit 413 may select peripheral memory for the memory allocation request, when the thread based on the thread information is a thread executed by a peripheral apparatus. The result of the selection is stored to a memory area such as in the RAM 205 and the flash ROM 206.

The securing unit 414 has a function of securing an area in the memory selected by the selecting unit 413. For example, the securing unit 414 secures an area in the main memory 103, when the main memory 103 has been selected. The source of the request is notified of the secured area.

The notifying unit 415 has a function of notifying the upper-level memory managing unit 404 of the utilization state of memory. For example, the notifying unit 415 that is a function of the main memory managing unit 311, notifies the upper-level memory managing unit 404 of the utilization state of the main memory 103. Similarly, the notifying unit 415 that is a function of the DSP memory managing unit 312, notifies the upper-level memory managing unit 404 of the utilization state of the DSP memory 202. Further, the notifying unit 415 that is a function of the GPU memory managing unit 313, notifies the upper-level memory managing unit 404 of the utilization state of the GPU memory 102.

Figure 5:
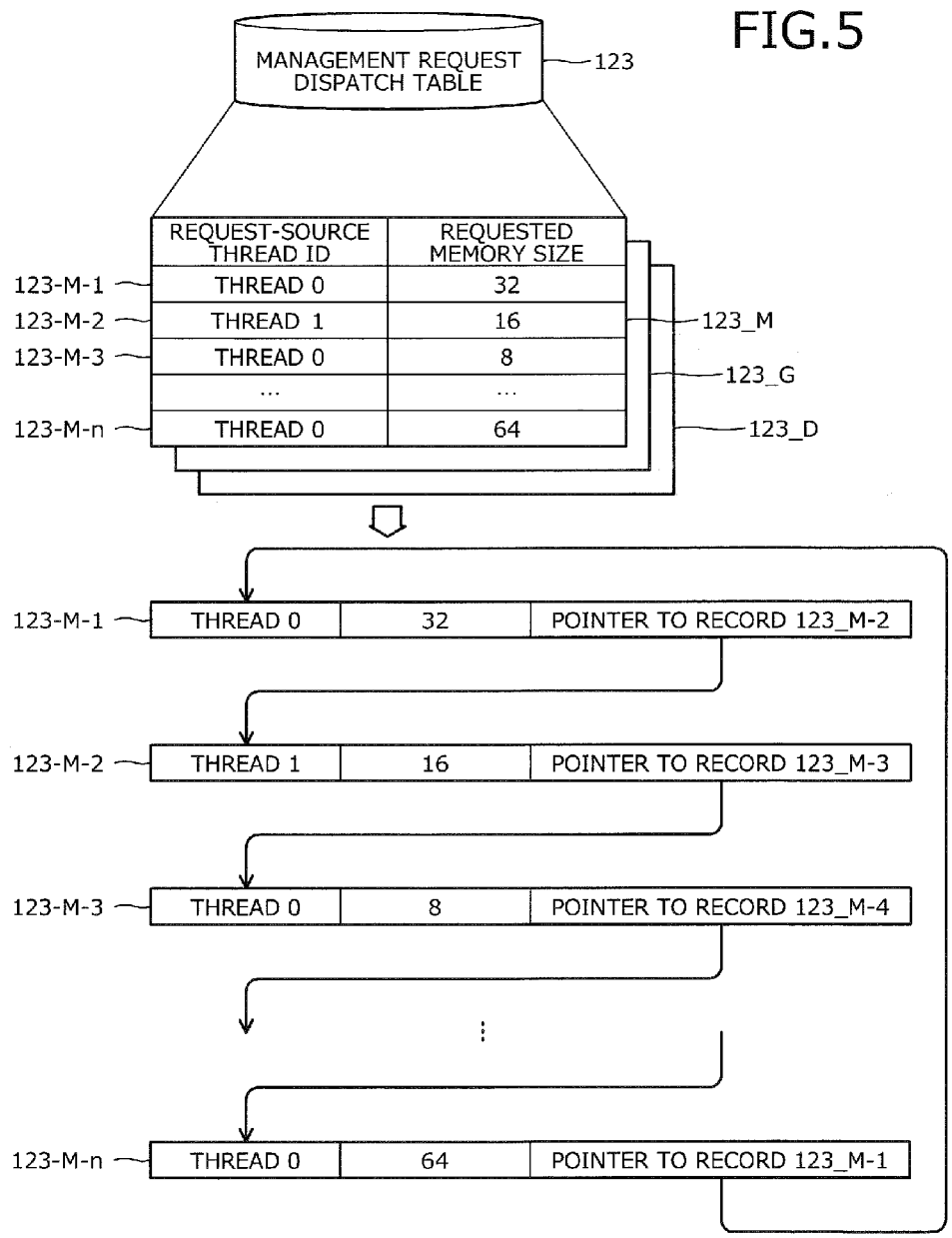
FIG. 5 is a diagram depicting an example of the contents of a management request dispatch table.

FIG. 5 is a diagram depicting an example of the contents of the management request dispatch table. With reference to FIG. 5, the contents of the management request dispatch table 123 will be described. The management request dispatch table 123 resides on each memory.

In the present embodiment, the management request dispatch table 123 stores management requests for 3 memories, including the main memory 103, the GPU memory 102, and the DSP memory 202. Management requests for the main memory 103 are stored to the management request dispatch table 123_M; management requests for the GPU memory 102 are stored to the management request dispatch table 123_G; and management requests for the DSP memory 20 are stored to the management request dispatch table 123_D. Hereinafter, although description will be given for the management request dispatch table 123_M, the management request dispatch table 123_G and the management request dispatch table 123_D have similar contents and therefore, description thereof is omitted.

The management request dispatch table 123_M depicted in FIG. 5 stores records 123_M–1 to 123_M–n, where "n" is a natural number. The management request dispatch table 123_M has 2 fields respectively for request-source thread IDs and the requested memory sizes. The request source thread ID field stores the ID of the thread that has issued the memory allocation request. The requested memory size field stores the number of bytes indicated in the memory allocation request. For example, record 123_M–1 stores the memory allocation request of 32 [bytes] from the thread 0.

The management request dispatch table 123_M resides in the heap area, which is dynamically securable memory and has a structure in which the records are connected by pointers. For example, record 123_M–1 has a pointer to record 123_M–2. Similarly, record 123_M–2 has a pointer to record 123_M–3; and record 123_M–3 has a pointer to record 123_M–4. Further, record 123_M–n has a pointer to record 123_M–1.

Although the management request dispatch table 123 depicted in FIG. 5 depicts memory allocation requests as memory management requests, requests for re-securing memory and for releasing memory may be included as other memory management requests. Further, requests for reading and writing with respect to memory may be included as memory management requests. In this case, fields retained by 1 record of the management request dispatch table 123 are the request source thread ID field and parameters of the requests. Examples of a parameters of a request include parameters of the realloc( ) function when the request is for the re-securing of memory; parameters of a free( ) function when the request is for the release of memory, an assigned address, and a requested memory size; and an address to be released.

FIG. 6 is a diagram of an example of the contents of the memory utilization table. The memory utilization table 421 stores for each type of memory, the available capacity. The memory utilization table 421 depicted in FIG. 6 has records 421-1 to 421-3. The records 421-1 to 421-3 are registered in order of the access speed by the threads executed by the CPUs #0 and #1. For example, although the records 421-1 to 421-3 depicted in FIG. 6 are depicted to be registered in descending order, the records 421-1 to 421-3 may be registered in ascending order.

The memory utilization table 421 has 2 fields for memory types and available capacities. The memory type field stores identification information for identifying the memory. The available capacity field stores the available capacity of the memory.

For example, record 421-1 indicates that the available capacity of the main memory 103, which has the fastest access speed among the memory group, is 50 [Mbytes]. Record 421-2 indicates that the available capacity of the GPU memory 102, which has the next fastest access speed, is 10 [Mbytes]. Record 421-3 indicates that the available capacity of the DSP memory 202, which has a slow access speed, is 20 [Mbytes].

FIG. 7 is a diagram of an example of the thread operation history table. The thread operation history table 422 stores a history of the threads run in the past. The thread operation history table 422 depicted in FIG. 7 has records 422-1 to 422-5. The thread operation history table 422 has 2 fields for thread IDs and CPU IDs. The thread ID field stores the ID of a thread that has been run. The CPU ID field stores the ID of the CPU on which the thread was run.

For example, the thread operation history table 422 depicted in FIG. 7 indicates that the memory management thread 122 and the thread 1 have been run 2 times on the CPU #1, and the thread 0 has been run 1 time on the CPU #0.

Figure 8:
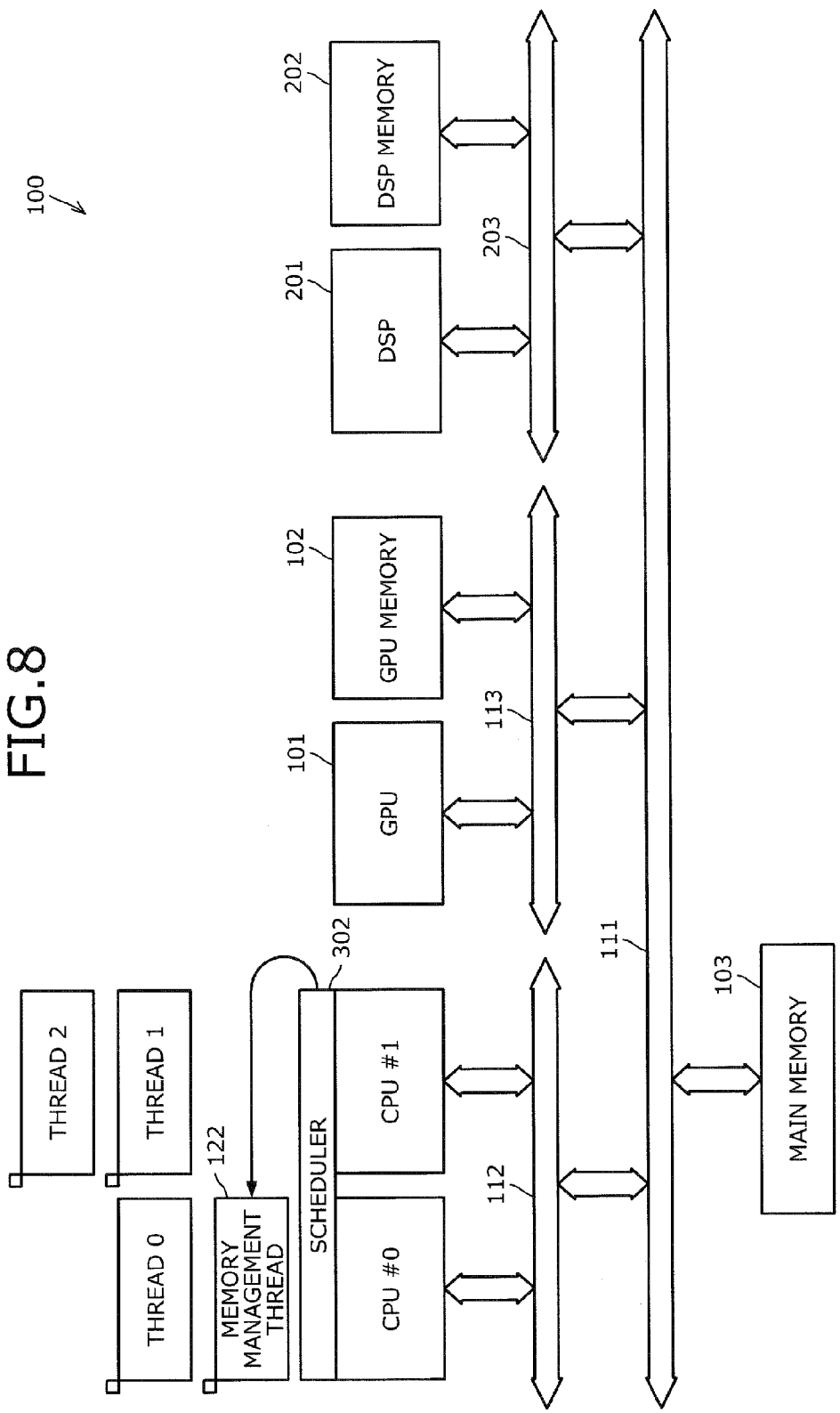
FIG. 8 is a diagram of an example of a thread assigning method when CPU loads are not in a balanced state.
Figure 9:
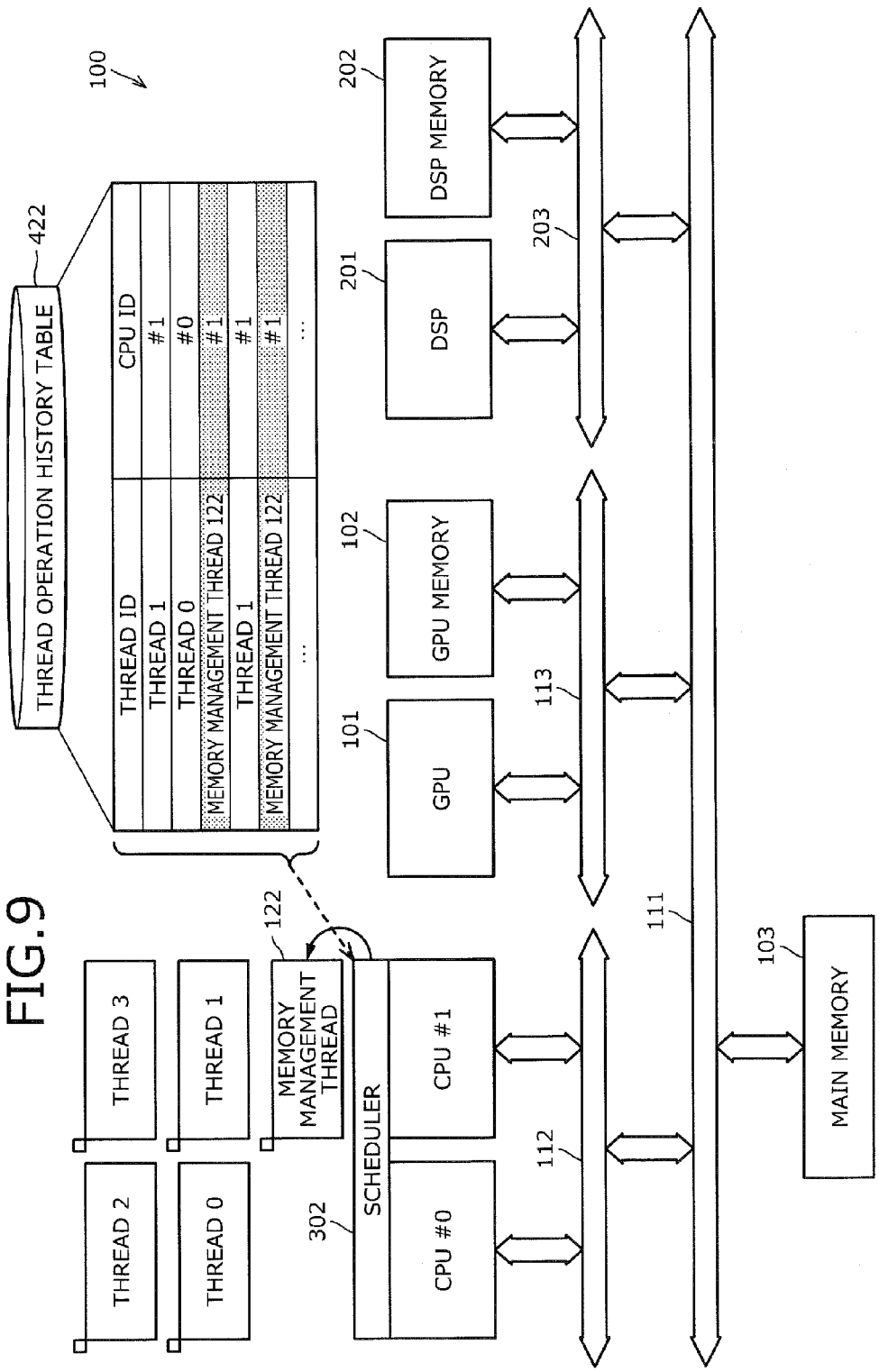
FIG. 9 is a diagram of an example of a thread assigning method when the CPU loads are in a balanced state.
Figure 10:
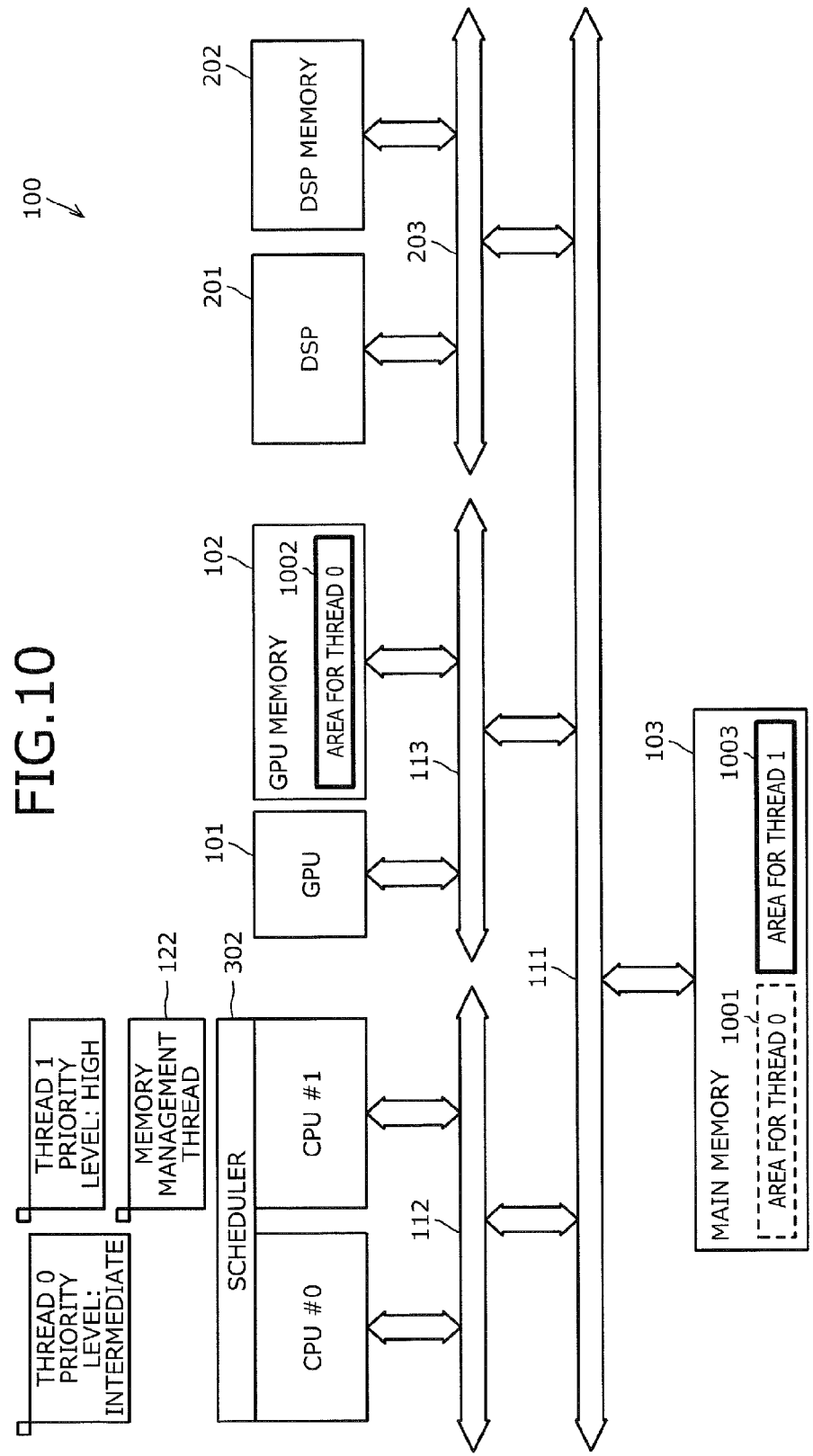
FIG. 10 is a diagram depicting examples of a memory securing method.
Figure 11:
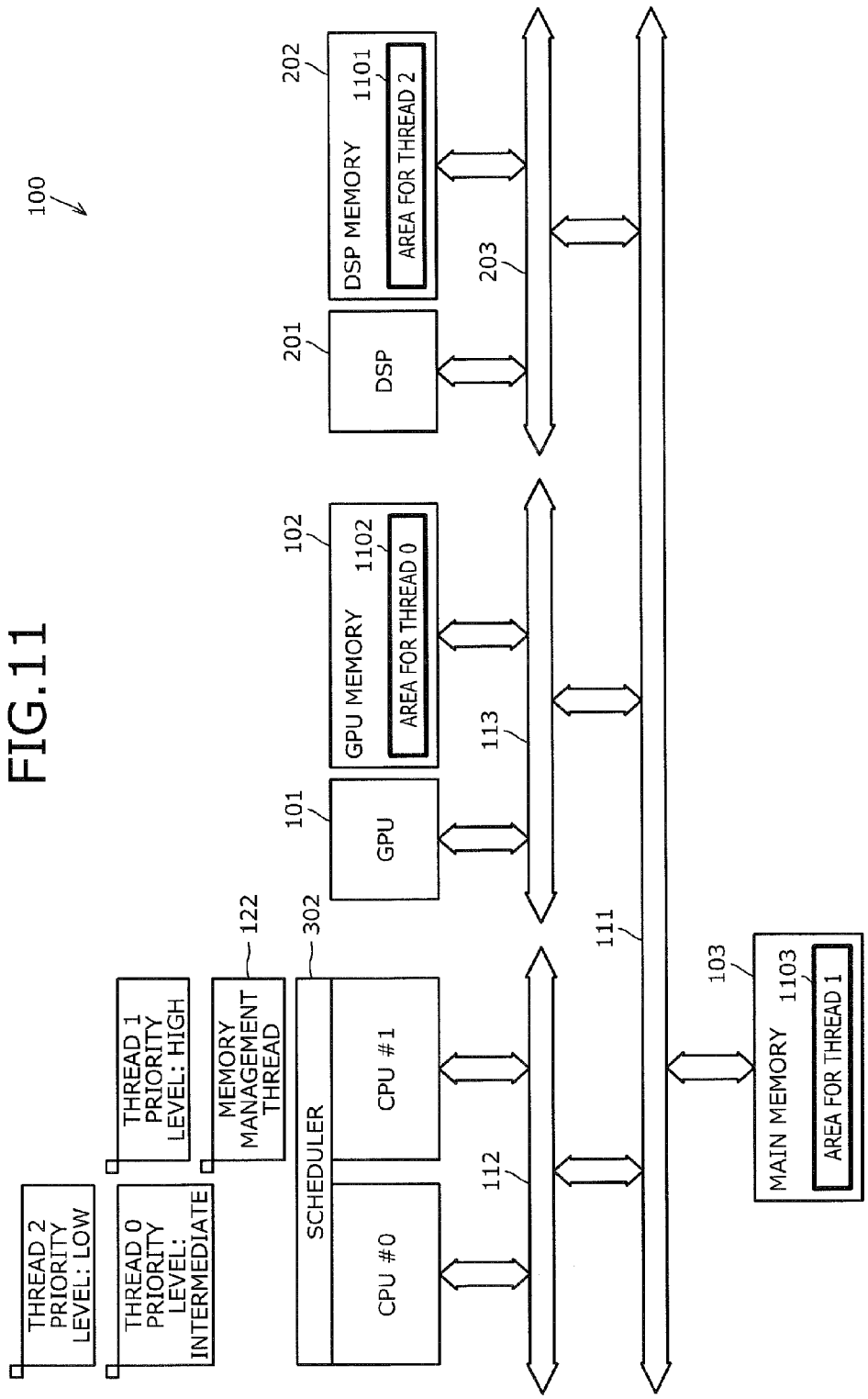
FIG. 11 is another diagram depicting examples of a memory securing method.

The multi-core processor system 100 uses the function depicted in FIG. 4 and the stored contents depicted in FIGS. 5 to 7 to assign threads and secure memory. FIGS. 8 and 9 depict examples of a thread assigning method; and FIGS. 10 and 11 depict examples of a memory securing method.

FIG. 8 is a diagram of an example of a thread assigning method when CPU loads are not in a balanced state. In the multi-core processor system 100 depicted in FIG. 8, the CPU #0 executes the thread 0; and the CPU #1 executes the thread 1 and a thread 2. In this state, if the memory management thread 122 is assigned, the multi-core processor system 100 depicted in FIG. 8 is in a state in which the CPU loads are not in a balanced state and therefore, the scheduler 302 assigns the memory management thread 122 to the CPU having the smallest load.

FIG. 9 is a diagram of an example of a thread assigning method when the CPU loads are in a balanced state. In the multi-core processor system 100 depicted in FIG. 9, the CPU #0 executes the thread 0 and the thread 2; and the CPU #1 executes the thread 1 and a thread 3. In this state, if the memory management thread 122 is assigned, the multi-core processor system 100 depicted in FIG. 9 is in a state in which the CPU loads are in a balanced state and therefore, the scheduler 302 assigns the memory management thread 122 to the CPU #0, #1 to which the memory management thread 122 has been assigned in the past.

In the example depicted in FIG. 9, the scheduler 302 refers to the thread operation history table 422 and since the memory management thread 122 has been operated by the CPU #1 twice in the past, assigns the memory management thread 122 to the CPU #1. Thread assignment to the same CPU increases as a result of assigning the threads based on the past operation history.

Examples of a memory securing method will be described with reference to FIGS. 10 and 11. The thread 0 depicted in FIGS. 10 and 11 is assumed to be a menu program, uses the GPU 101, and has an intermediate priority level. The thread 1 is assumed to be a multimedia program, uses the DSP 201, and has a high priority level. The thread 3 is assumed to be a communication program and has a low priority level.

FIG. 10 is a diagram depicting examples of a memory securing method. First, the CPU #0, which executes the thread 0, accesses an area 1001 that is in the main memory 103 and allocated for the thread 0 by the memory management thread 122 to execute a process. The area 1001 for the thread 0 is allocated in the main memory 103 consequent to, for example, no area in the GPU memory 102 or the DSP memory 202 being available when the area 1001 was allocated.

Next, if the CPU #0 executes the thread 0 and the CPU #1 executes the high-priority thread 1, the memory management thread 122 performs the memory allocation request from the thread having the lower priority. In the case of FIG. 10, after performing the memory allocation request of the thread 0, the memory management thread 122 performs the memory allocation request of the thread 1.

First, the memory management thread 122 executes the GPU memory managing unit 313, secures in the GPU memory 102 for which the access speed is slow, an area 1002 for the thread 0. Next, the memory management thread 122 executes the main memory managing unit 311 and secures in the main memory 103 for which the access speed is high, an area 1003 for the thread 1.

FIG. 11 is another diagram depicting examples of a memory securing method. In the multi-core processor system 100 depicted in FIG. 11, the CPU #0 has been assigned the thread 0 and the thread 2; and the CPU #1 has been assigned the thread 1.

In this case, first, the memory management thread 122 performs the memory allocation request of the thread 2; subsequently, performs the memory allocation request of the thread 0; and finally, performs the memory allocation request of the thread 1. First, the memory management thread 122 executes the DSP memory managing unit 312 and secures in the DSP memory 202 for which the access speed is slow, an area 1101 for the thread 2. Next, the memory management thread 122 executes the GPU memory managing unit 313 and secures in the GPU memory 102 for which the access speed is intermediate, an area 1102 for the thread 0. Finally, the memory management thread 122 executes the main memory managing unit 311 and secures in the main memory 103 for which the access speed is high, an area 1103 for the thread 1.

In the state depicted in FIG. 11, consequent to the running of a new thread that uses the GPU 101, the multi-core processor system 100 may release the area 1102 for the thread 0. In this case, the thread using the GPU initializes the GPU 101 and the GPU memory 102.

Figure 12:
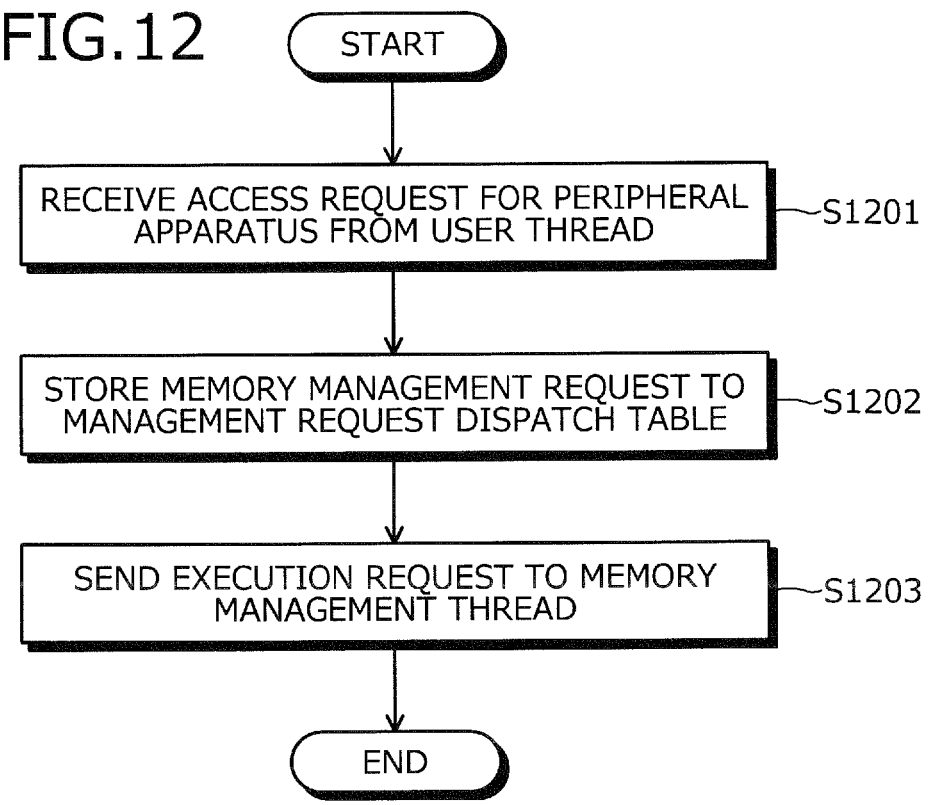
FIG. 12 is a flowchart of an example of a memory management request process.

FIG. 12 is a flowchart of an example of a memory management request process. Although the memory management request process is executed by the dummy device driver 121 of each CPU, in the example depicted in FIG. 12, the memory management request process is assumed to be executed by the dummy device driver 121#0 of the CPU #0. The CPU #0 receives an access request for a peripheral apparatus from a user thread (step S1201). The CPU #0 stores the memory management request to the management request dispatch table 123 (step S1202). The CPU #0 sends an execution request to the memory management thread 122 (step S1203), and ends the memory management request process.

Figure 13:
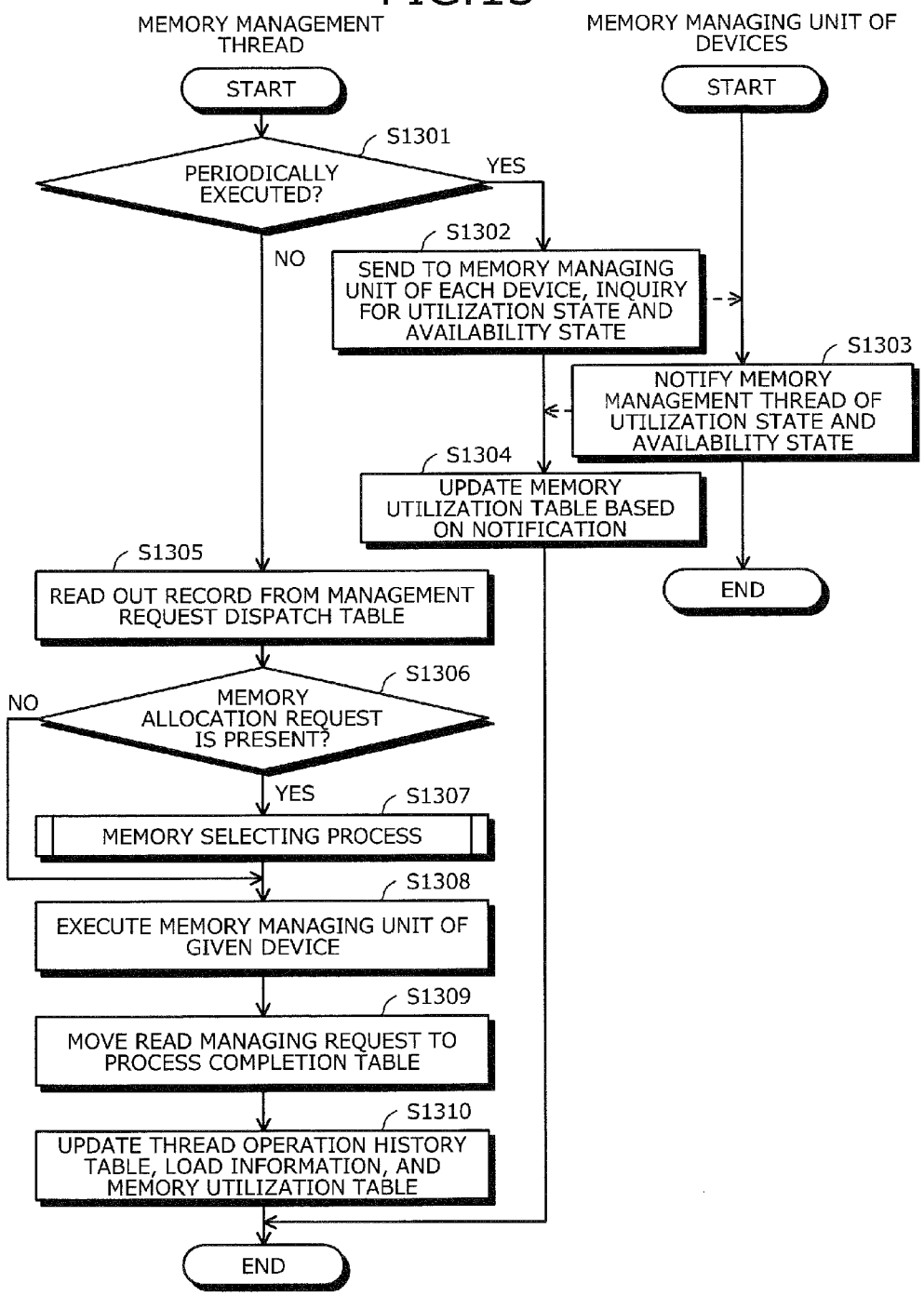
FIG. 13 is a flowchart of an example of a process executed by a memory management thread.
Figure 14:
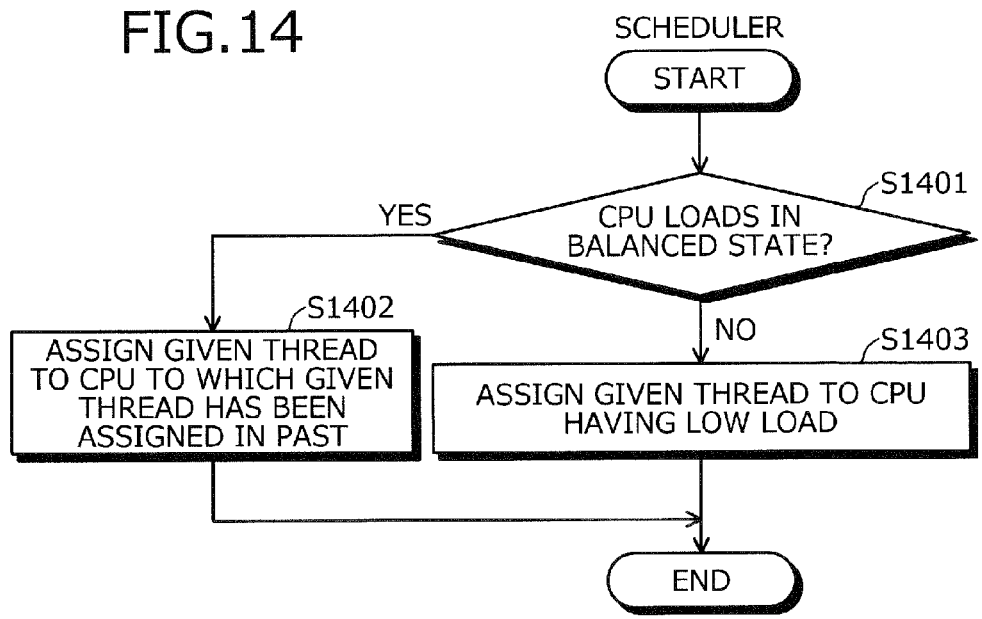
FIG. 14 is a flowchart of an example of an assignment-destination CPU selecting process performed by a scheduler.

FIG. 13 is a flowchart of an example of a process executed by the memory management thread. The memory management thread 122, by an assignment-destination CPU selecting process of the scheduler 302 depicted in FIG. 14, is executed by any one among the CPU #0 and the CPU #1. In FIG. 13, the memory management thread 122 is assumed to be executed by the CPU #0.

The CPU #0 determines whether the memory management thread 122 has been periodically executed (step S1301). If periodically executed (step S1301: YES), the CPU #0 sends to the memory managing unit of each device, an inquiry for the utilization state and the availability state (step S1302). The CPU #0, after receiving an inquiry as a memory management unit of the devices, notifies the memory management thread 122 of the utilization state and the availability state (step S1303). The CPU #0 having received notification of the utilization state and the availability state, updates the memory utilization table 421 based on the notification (step S1304), and ends the process of the memory management thread 122.

If the memory management thread 122 has not been periodically executed (step S1301: NO), the CPU #0 reads out a record from the management request dispatch table 123 (step S1305). Multiple records may be stored in the management request dispatch table 123. If multiple memory allocation requests are present, the CPU #0 may sequentially read out the records starting from that of a memory allocation request from a thread having a low priority level.

If the CPU #0 cannot secure memory for a high-priority thread consequent to securing memory for the high-priority thread after securing memory for a thread having a low priority level, the CPU #0 swaps out the memory for the low-priority thread with the flash ROM 206 or the flash ROM 208. Thus, by rearranging the secured areas, the multi-core processor system 100 can prevent fragmentation of the memory areas. If memory is secured for the threads in descending order of thread priority level, secured areas cannot be moved from low-priority threads to high-priority threads, increasing the risk of fragmentation of the memory areas.

After reading the record, the CPU #0 determines whether a memory allocation request is present in the record (step S1306). If a memory allocation request is present (step S1306: YES), the CPU #0 executes a memory selecting process (step S1307). The memory selecting process will be described with reference to FIG. 15.

After execution of the memory selecting process or if no memory allocation request is present (step S1306: NO), the CPU #0 executes the memory managing unit of a given device (step S1308). As an execution process of the memory managing unit of the given device, for example, if the memory management request is a memory allocation request, the CPU #0 secures a memory area in given memory. The given memory is the memory selected at step S1504 or step S1505. For example, in a case where the main memory 103 has been selected, the main memory 103 is the given memory.

The CPU #0 moves the read managing request to a process completion table (step S1309), updates the thread operation history table 422, load information, and the memory utilization table 421 (step S1310), and ends the process of the memory management thread 122. The process completion table stores completed memory management requests correlated with returned values. The dummy device driver 121 refers to the returned value for the memory management request in the process completion table and sends a response for the memory management request to the app that called the dummy device driver 121.

FIG. 14 is a flowchart of an example of the assignment-destination CPU selecting process that is for a given thread to be assigned and performed by the scheduler. The scheduler 302, in the present embodiment, is assumed to be executed by the CPU #0. The given thread to be assigned is a user thread, the memory management thread 122, etc.

The CPU #0 determines whether the CPU loads are in a balanced state (step S1401). If the CPU loads are in a balanced state (step S1401: YES), the CPU #0 assigns the given thread to a CPU to which the given thread has been assigned in the past (step S1402). If the CPU loads are not in a balanced state (step S1401: NO), the CPU #0 assigns the given thread to a CPU having a low load (step S1402). After the operation at steps S1402 and S1403, the CPU #0 ends the assignment-destination CPU selecting process for the given thread.

Figure 15:
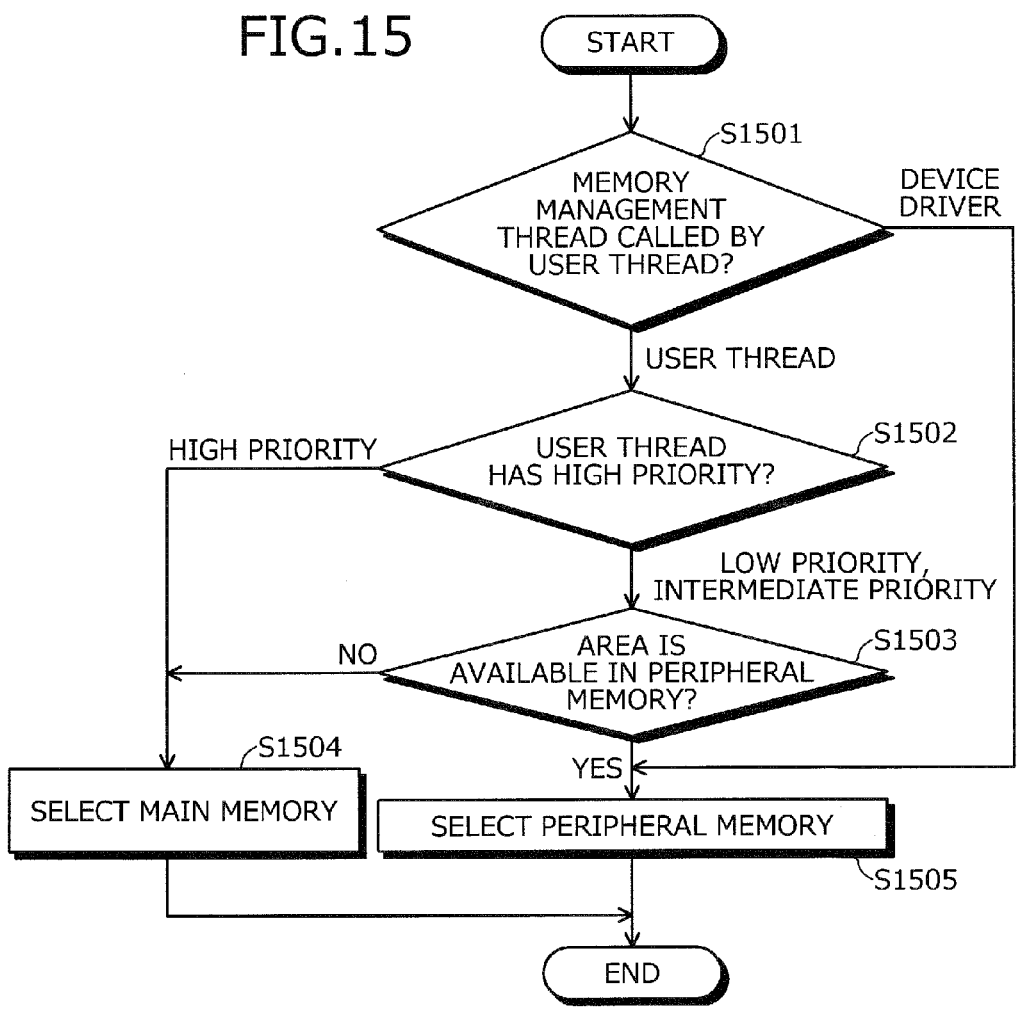
FIG. 15 is a flowchart of an example of a memory selecting process.

FIG. 15 is a flowchart of an example of the memory selecting process. The memory selecting process is executed by the same CPU that executes the memory management thread 122. Here, the CPU #0 is assumed to execute the memory selecting process. The CPU #0 determines whether the memory management thread 122 has been called by a user thread (step S1501).

If the memory management thread 122 has been called by a user thread (step S1501: user thread), the CPU #0 determines whether the user thread has a high priority (step S1502). If the user thread has a low priority or an intermediate priority (step S1502: low priority, intermediate priority), the CPU #0 refers to the thread operation history table 422, and determines whether an area is available in the peripheral memory (step S1503).

If no area is available (step S1503: NO), or if the user thread has a high priority (step S1502: high priority), the CPU #0 selects the main memory 103 from among the main memory 103 and peripheral memory (step S1504). After making the selection, the CPU #0 ends the memory selecting process. If an area is available (step S1503: YES), or if the memory management thread 122 has been called by a device driver (step S1501: device driver), the CPU #0 selects the peripheral memory from among the main memory 103 and the peripheral memory (step S1505). After making the selection, the CPU #0 ends the memory selecting process.

Figure 16:
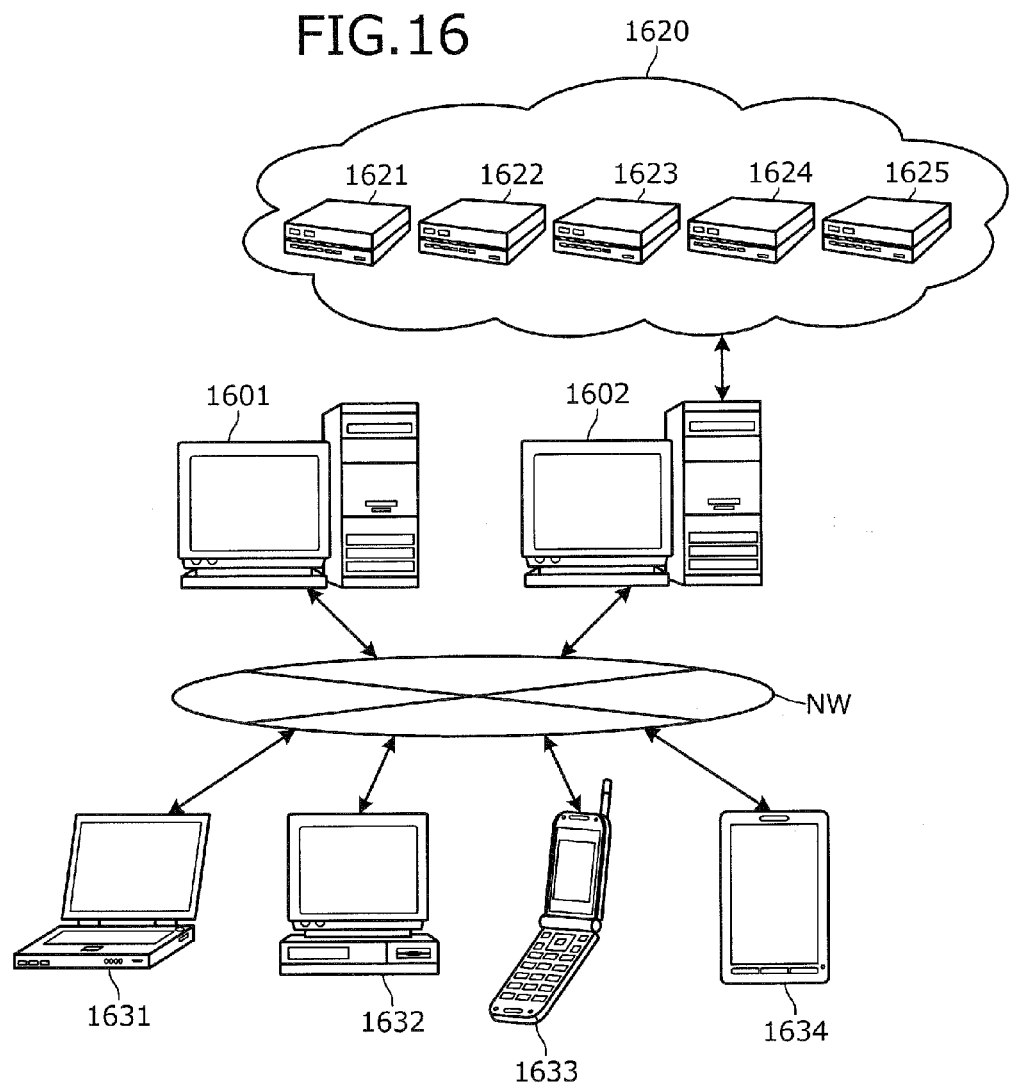
FIG. 16 is a diagram of an application example of a system that uses a computer of an embodiment.

FIG. 16 is a diagram of an application example of a system that uses a computer of the present embodiment. In FIG. 16, a network NW enables communication among a server 1601, a server 1602, clients 1631 to 1634, and includes a LAN, a WAN, the Internet, a mobile telephone network, and the like.

The server 1602 is a management server of a group of servers (servers 1621 to 1625) having a cloud 1620. The client 1631 is a notebook personal computer (PC). The client 1632 is a desktop PC; and the client 1633 is a mobile telephone. The client 1633 may be a smartphone, or a personal handyphone system (PHS) telephone, in addition to a mobile telephone. The client 1634 is a tablet terminal.

In FIG. 16, the server 1601, the server 1602, the servers 1621 to 1625, and the clients 1631 to 1634, for example, execute the data processing system according to the present embodiment as the data processing apparatuses described in the embodiment. For example, the server 1621 is assumed to have the fastest memory; and the servers 1622 to 1625 are assumed to have low-speed memory. In this case, the data processing system can execute the data processing method of the present embodiment by using the memory of the server 1621 as the main memory 103, and the memory of the servers 1622 to 1625 as the memory of the peripheral apparatuses.

As described, the data processing system and the data processing method enable memory management requests from threads under execution by multiple data processing apparatuses to be stored to shared memory, management requests to be read out sequentially, and areas of the main memory and peripheral apparatus memory to be secured. As a result, memory can be managed such that contention consequent to concurrent access by multiple data processing apparatuses in the data processing system does not occur. For example, since the data processing apparatus reads from the shared memory in a sequential manner, the memory management requests are not called at the same timing and therefore, access contention does not occur.

The data processing system may assign the memory management thread that manages memory, to the data processing apparatus having the smallest load among the data processing apparatuses, if the data processing apparatus loads are not in a balanced state. As a result, data processing system can distribute the load of memory managing process without causing access contention. In a conventional example of a data processing system, if multiple memories are attempted to be managed by an arbitrary data processing apparatus, exclusive control process is necessary causing overhead to increase. Further, in a conventional example of a data processing system, if multiple memories are attempted to be managed by a singular data processing apparatus, the distribution of load becomes uneven.

The data processing system may assign the memory managing thread to a data processing apparatus to which the memory managing thread has been assigned in the past, if the load of the data processing apparatuses are in a balanced state. As a result, the data processing apparatus to which the memory managing thread is assigned can use, in the cache memory, the existing cache for the tread and thereby, perform the process faster.

For example, the memory management thread has memory management routines as programs, and an allocation table of the secured memory areas as data. If memory management routines remain in the instruction cache, the memory management thread can immediately execute the process. Further, if the allocation table remains in the data cache, the memory management thread can immediately manage the table.

The data processing system may secure an area in any one among the main memory and peripheral memory, based on the priority level information of a thread that has issued a memory allocation request. The data processing system may secure an area in memory for which the memory access speed is high, if the thread that issued the memory allocation request has a high priority. As a result, for a thread requiring high-speed processing, the data processing system uses memory that can accommodate high-speed access, enabling high-speed processing.

The data processing system may secure an area in peripheral memory, if the thread that issued the memory allocation request has an intermediate or a low priority and the peripheral memory has an available area. Peripheral memory consumes less power than the main memory to the extent to which peripheral memory is slower than the main memory. Therefore, when high-speed processing need not be performed, the data processing system can reduce power consumption and improve power efficiency by securing an area in peripheral memory, which has low power consumption.

The data processing system may secure an area in peripheral memory, if the thread that issued the memory allocation request manages a peripheral apparatus. As a result, the data processing system can execute a thread corresponding to a peripheral apparatus even if the thread is a thread that uses the peripheral apparatus.

The data processing system may collect the utilization states of memory and of peripheral memory. As a result, the data processing system can confirm the available capacity of each peripheral memory and thereby, secure an area from available memory for which the access speed is slow.

The data processing method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to one aspect of the embodiment, multiple memories can be managed without contention occurring consequent to concurrent memory access.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing system comprising:
    a plurality of data processing apparatuses;
    a peripheral apparatus;
    a memory, the memory being shared by the plurality of data processing apparatuses and the peripheral apparatus; and
    a peripheral memory corresponding to the peripheral apparatus,
    a first data processing apparatus among the plurality of data processing apparatuses executing
        a first memory manager configured to read a priority level of a thread among a plurality of threads from a heap area sequentially storing thread information of the plurality of threads, including thread priority level information, each thread among the plurality of threads being executed by any one of a data processing apparatus among the plurality of data processing apparatuses and the peripheral apparatus; and
        a second memory manager configured to secure an area among any one of the memory and the peripheral memory for each thread among the plurality of threads according to ascending priority level,
    wherein the second memory manager secures an area in memory having a higher access speed among the memory and the peripheral memory when the thread priority level information indicates high priority.

2. The data processing system according to claim 1, further comprising
    a scheduler configured to assign execution of the second memory manager to a data processing apparatus having a smallest load among the plurality of data processing apparatuses when loads of the plurality of data processing apparatuses are in an unbalanced state.

3. The data processing system according to claim 1, further comprising
    a scheduler configured to assign the thread among the plurality of threads to a data processing apparatus to which the thread has been previously assigned when loads of the plurality of data processing apparatuses are in a balanced state.

4. The data processing system according to claim 1, wherein
    the second memory manager secures an area in the peripheral memory when the thread priority level information indicates any one of intermediate priority and low priority and the peripheral memory has an available area.

5. The data processing system according to claim 1, wherein
    the second memory manager secures an area in the peripheral memory when the thread is a thread that manages the peripheral apparatus.

6. The data processing system according to claim 1, wherein
    the first memory manager manages utilization states of the memory and the peripheral memory, and
    the second memory manager periodically notifies the first memory manager of the utilization states of the memory and the peripheral memory.

7. A data processing method comprising:
    reading a priority level of a thread among a plurality of threads from a heap area sequentially storing thread information of the plurality of threads, including thread priority level information, each thread among the plurality of threads being executed by any one of a data processing apparatus among a plurality of data processing apparatuses and a peripheral apparatus; and
    securing an area among any one of a memory that is shared by the plurality of data processing apparatuses and peripheral memory corresponding to the peripheral apparatus for each thread among the plurality of threads according to ascending priority level, wherein
    the data processing method is executed by a first data processing apparatus among the plurality of data processing apparatuses,
    wherein the securing includes securing an area in memory having a higher access speed among the memory and the peripheral memory, when the thread priority level information indicates high priority.

8. The data processing method according to claim 7, wherein
    the securing includes securing an area in the peripheral memory, when the thread priority level information indicates any one of intermediate priority and low priority, and the peripheral memory has an available area.

* * * * *